United States Patent [19]

Hollander

[11] Patent Number: 5,570,983
[45] Date of Patent: Nov. 5, 1996

[54] REDUCED-FRICTION SCREW

[76] Inventor: Andrew A. Hollander, 202-15 42nd Ave., Apt. 7A, Bayside, N.Y. 11361

[21] Appl. No.: 312,888

[22] Filed: Sep. 27, 1994

[51] Int. Cl.$^6$ ........................................... F16B 25/00
[52] U.S. Cl. ........................ 411/386; 411/308; 411/411
[58] Field of Search ................................. 411/386, 399, 411/411, 414, 417–418, 420, 423–424, 307–311, 412–413, 938

[56] References Cited

U.S. PATENT DOCUMENTS

| | | | |
|---|---|---|---|
| 42,475 | 4/1864 | Harvey | 411/423 |
| 493,585 | 3/1893 | Herzberg et al. | |
| 867,552 | 10/1907 | Bradford | 411/413 |
| 1,933,332 | 10/1933 | May | 411/418 |
| 2,128,757 | 8/1938 | Olson | |
| 2,352,540 | 6/1944 | Hanneman | 411/308 |
| 2,473,752 | 6/1949 | Johnson | 411/938 |
| 2,587,544 | 2/1952 | Sneddon | |
| 2,668,072 | 2/1954 | Falk | 292/165 |
| 3,351,115 | 11/1967 | Boehlow | 411/308 |
| 3,469,491 | 9/1969 | Munsey | |
| 3,878,759 | 4/1975 | Carlson | |
| 4,189,975 | 2/1980 | Nisida | 411/423 |
| 4,334,814 | 6/1982 | McKewan | 411/311 |
| 4,516,893 | 5/1985 | Barth | |
| 4,572,720 | 2/1986 | Rockenfeller et al. | |
| 4,705,441 | 11/1987 | Arnold | |
| 4,764,066 | 8/1988 | Terrell | 411/399 |
| 4,820,235 | 4/1989 | Weber et al. | |
| 5,188,496 | 2/1993 | Giannuzzi | 411/310 |
| 5,199,839 | 4/1993 | DeHaitre | 411/399 |
| 5,203,657 | 4/1993 | Nagoshi et al. | |
| 5,226,766 | 7/1993 | Lasner | |
| 5,249,882 | 10/1993 | Nagoshi et al. | 411/399 |
| 5,294,227 | 3/1994 | Forster et al. | 411/386 |

FOREIGN PATENT DOCUMENTS

| | | |
|---|---|---|
| 0589398A1 | 3/1994 | European Pat. Off. |
| 95306699 | 1/1996 | European Pat. Off. |
| 2291397 | 6/1976 | France |
| 2543960 | 4/1977 | Germany |
| 9108879.8 | 11/1991 | Germany |
| 1494015 | 12/1977 | United Kingdom |
| 1563931 | 4/1980 | United Kingdom |

*Primary Examiner*—Steven N. Meyers
*Assistant Examiner*—Gary Estremsky
*Attorney, Agent, or Firm*—Fish & Richardson P.C.

[57] ABSTRACT

A reduced-friction screw is described. The screw requires less turning torque than a conventional screw to drive it into a workpiece. The shaft of the screw has a reduced-thickness thread that produces less sliding friction than a conventional screw having thread of the same depth and pitch. In addition, the holding ability of the reduced-friction screw is substantially the same as a conventional screw having thread of the same pitch and depth. Another embodiment contains a shaft having a reduced diameter, to further reduce sliding friction. Yet another embodiment contains a segmented, reduced-thickness thread that resists removal and loosening when the workpiece is subject to twisting, vibration, or warping. To prevent loosening of the reduced-friction screw, the bottom of the screw head may contain protrusions to increase the frictional contact of the head with the workpiece.

9 Claims, 6 Drawing Sheets

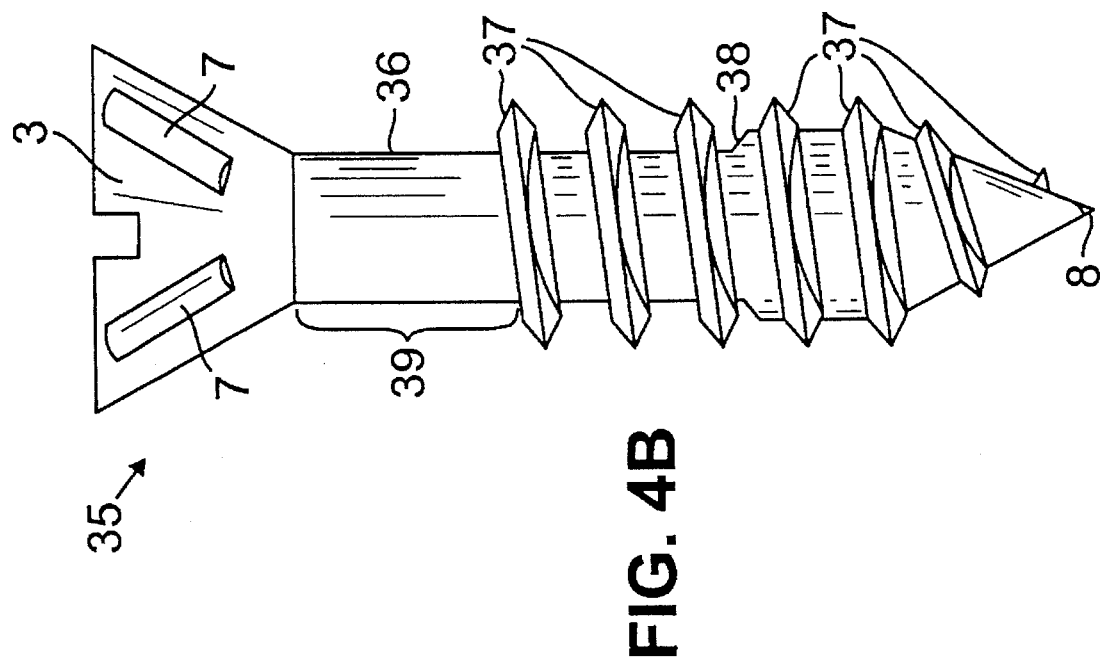
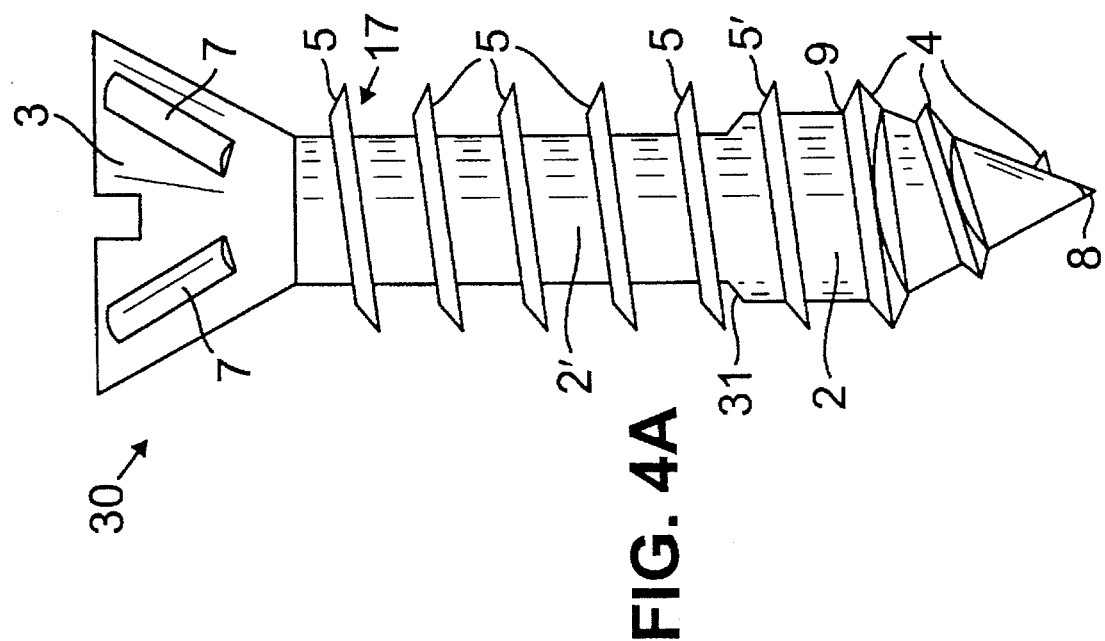
FIG. 4B
FIG. 4A

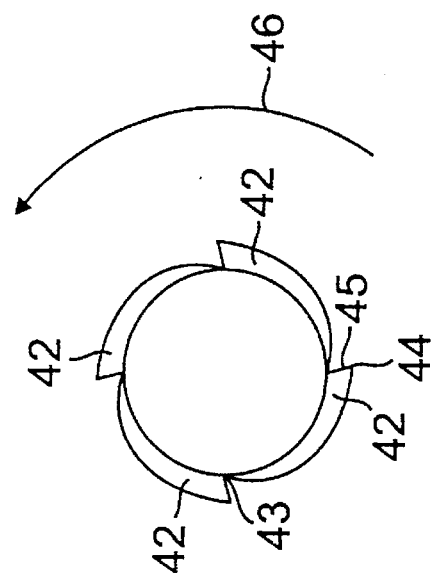
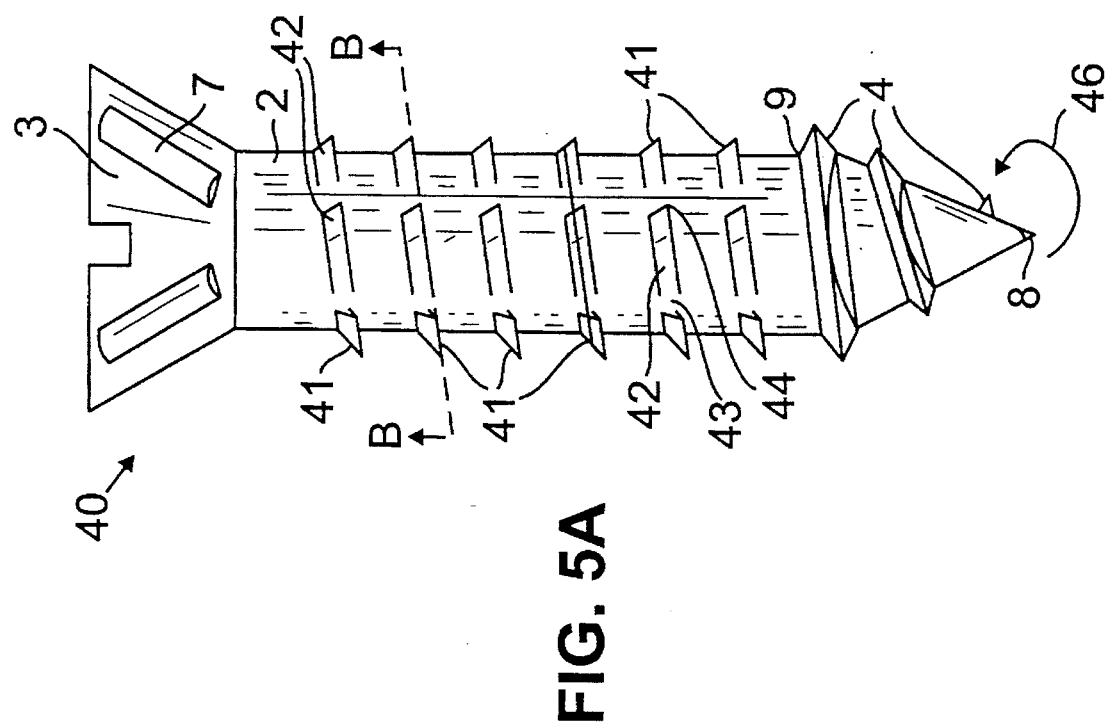
FIG. 5B
FIG. 5A

REDUCED-FRICTION SCREW

FIELD OF THE INVENTION

The present invention relates to a screw which requires less torque to drive it into a workpiece than conventional screws. The screw has substantially the same holding power as conventional screws, and can be used, for example, in wood, particle boards, and other similar materials.

BACKGROUND OF THE INVENTION

In applications where a screw is employed to secure workpieces together, the screw may be inserted without first preparing the workpiece, or a pilot hole may be drilled. One reason for drilling a pilot hole is to reduce the turning torque required to drive the screw into the material. The turning torque of a screw is that force required to cut a channel or groove in the material into which the screw is driven, and to overcome the sliding friction between the material and the thread and shaft of the screw as it is turned. The turning torque is of particular concern when driving long, large diameter screws into hard materials. In order to reduce friction, a lubricant may also be applied to the thread of the screw. However, even if the material and the screw are prepared as described above, the torque required to drive the screw completely into the material may be too large to permit the comfortable use of a hand-held screwdriver.

Conventional screws comprise a metallic shaft having an enlarged head on a first end, a tip on a second end and a uniform helical thread running from the tip toward the head. The thread at the tip cuts a helical channel into the workpiece as the screw is rotated by a turning tool. The trailing surface of the thread determines the holding power of the screw which can also be described as the resistance to screw pull-out from the workpiece. Although screws having a shaft length on the order of two inches and longer are typically used to fasten two workpieces together, the thread of such screws has been given little attention.

There are few references pertaining to thread shape. U.S. Pat. No. 5,226,766, which issued on Jul. 13, 1993 and is entitled "Bone Screw With Improved Threads", discloses a bone screw having a helical thread that increases in thickness from the tip to the head of the screw. Although such a screw will exhibit increased resistance to pull-out when fully inserted, the turning torque required to drive the screw into a material increases with screw length. Thus, the frequently-encountered problem of overcoming the turning torque when driving a long screw into a workpiece encountered by, for example, home builders and wood hobbyists, has not been addressed.

SUMMARY OF THE INVENTION

An object of the invention is to provide an improved screw for driving into wood or similar materials that requires a reduced turning torque in comparison to conventional screws of the same length which also have a thread of the same depth and pitch.

Another object is to provide a reduced-friction screw having substantially the same holding power as conventional screws of the same length with a thread of the same depth and pitch.

Yet another object is to provide a reduced-friction screw that resists loosening over time, and which resists loosening when the material is subject to twisting, vibration, or warping.

A reduced-friction screw according to the present invention has a head with a slot or other indentation suitable for accepting a turning tool, a hardened steel shaft connected to the head at one end and having a conical tip at the other end, and full and reduced-width thread.

The cross-sections of the thread of a reduced-friction screw according to the invention are a combination of two different types found along the shaft. The shape of the thread from the conical tip of the screw up to a full-shaft-diameter point at the base of the tip is conventional and symmetrical, and cuts the channel in a workpiece in a standard fashion. The shape of the thread after the full-shaft-diameter point is non-symmetrical, having a recessed leading surface and a conventionally-shaped trailing surface. While the conventional, channel-cutting thread is of full thickness, the non-symmetrical thread is of reduced thickness. Thus, the reduced thickness thread does not completely fill the channel that was cut in the workpiece by the leading, channel-cutting thread. The material cut by the leading, channel-cutting thread rebounds into the void between the reduced thickness thread and the workpiece, thereby reducing the pressure against the thread which results in a reduction of the sliding friction.

The reduced-friction screw exhibits adequate holding power when fully driven into a workpiece. The interaction of the force generated at the interface of the head of the reduced-friction screw and the outer surface of the material, and from the reaction force generated along the interface of the trailing surface of the reduced-thickness thread, which is of full depth except at the tip, serves to provide substantially the same holding power as a conventional screw of the same length having a thread of the same depth and pitch.

The underside of the head of a reduced-friction screw according to the invention preferably contains protrusions which contact the workpiece when the screw is driven fully and snugly into the material. The protrusions act to increase the frictional contact of the head with the workpiece, which further stabilizes the screw.

BRIEF DESCRIPTION OF THE DRAWINGS

FIG. 4A is a side view of another embodiment of a reduced-friction screw according to the invention which incorporates a reduced diameter shaft;

FIG. 4B is a side view of an alternate embodiment of the reduced-friction screw of FIG. 4A;

FIG. 5A is a side perspective view of yet another embodiment of a reduced-friction screw according to the invention which incorporates a segmented thread; and FIG. 5B is a cross-sectional view taken along line B—B of FIG. 5A.

DETAILED DESCRIPTION

Figure 1:
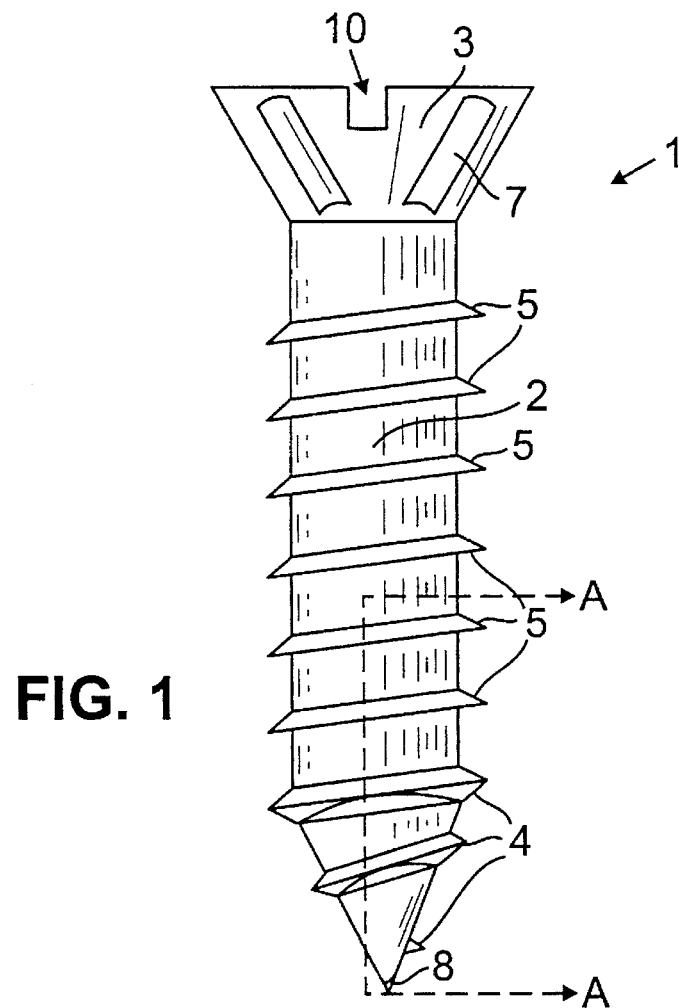
FIG. 1 is an enlarged side view of an embodiment of a reduced-friction screw according to the present invention.

FIG. 1 is a side view of a reduced-friction screw 1 according to the invention. The screw 1 is made of a suitable metallic material, and is shown having a head 3 with a slot 10 for accepting a turning tool (such as a screwdriver). The underside of the head 3 contains protrusions 7, which may be semi-cylindrical as shown, or may be wedge-shaped, with the apex facing the workpiece. The protrusions 7 contact the outer surface of a workpiece when the screw 1 is fully inserted, and function to resist loosening of the screw over time. The number and shape of the protrusions 7 may vary depending upon the resistance to loosening required.

Although a screw having a flat head 3 is shown in the drawings, other types of screw heads may be used. In addition, it is to be understood that the figures are not drawn to scale, and that like components have been numbered the same in the various figures.

The reduced-friction screw 1 of FIG. 1 has a hardened metal shaft 2. A conventional, full-thickness, channel-forming thread 4 is formed from the conical tip 8 of the screw 1 up until a full-diameter point 9 at the base of the tip 8, at which the shaft 2 is at its maximum diameter. Reduced-thickness thread 5 begins at the full-shaft-diameter point 9 and continues up the entire length of the shaft 2 to the head 3. The reduced-thickness thread 5 may, however, end at some predetermined distance from the head 3, as on a typical wood screw.

The shape of the cross-section of the thread of a conventional screw is uniform. To form a channel, the thread at the tip of a conventional screw compresses material out of the way as it penetrates a workpiece. The following thread completely fills the channel. The natural resiliency of the material creates a back pressure against the thread as the screw is turned, which creates a sliding friction along the entire length of the thread and shaft of the screw. Since the leading surface of the thread moves in a direction that tends to compress the material further when the screw is driven, the pressure against the leading surface is greater than that against the trailing surface. As a conventional screw is driven further into the material, the sliding friction increases. Thus, even though the turning torque required to form the channel remains essentially constant as the screw is driven deeper, the sliding friction increases since the surface area of the screw contacting the material increases. Depending upon the nature of the material and the length and depth of the thread of the screw, the turning torque required to overcome the sliding friction may become significantly larger than the turning torque required to form the channel as the screw burrows deeper into the material.

Referring again to FIG. 1, the reduced-thickness thread 5 of the reduced-friction screw 1 has the same pitch as the channel-forming thread 4. The channel-forming thread 4 drills a channel into a workpiece, and the reduced-thickness thread 5 travels in the full width channel cut by the channel-forming thread 4 with reduced sliding friction, as explained below.

Figure 2:
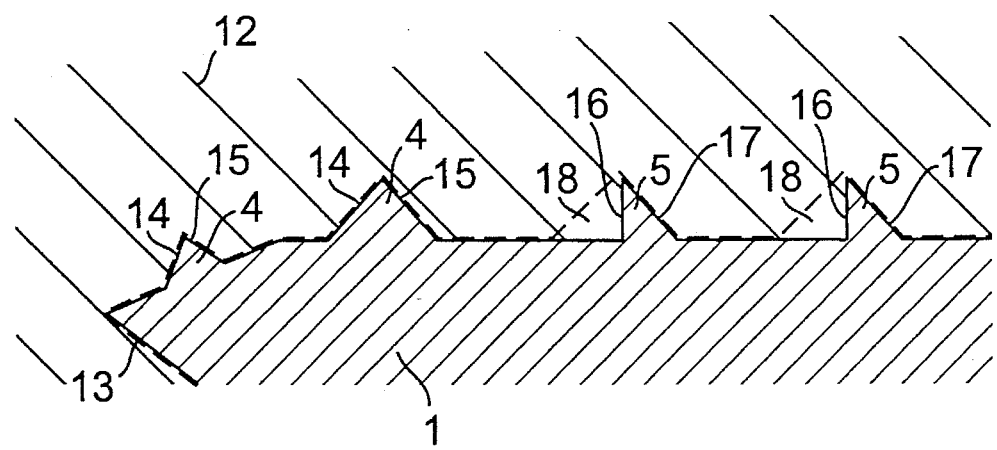
FIG. 2 is a cross-sectional side view taken along line A—A of the screw of FIG. 1.

FIG. 2 is a cross-sectional view taken along line A—A of FIG. 1 of the reduced-friction screw 1, shown after being driven into a material 12. As depicted, the reduced-thickness thread 5 have preferably the same depth as, but are about one-half the thickness of, the largest channel-forming thread 4. A dashed line 13 represents the outline of the channel formed in the material by the full thickness, channel-forming thread 4. The leading surfaces 14 and the trailing surfaces 15 of the channel-forming thread 4 fully contact the channel cut into the material 12. Conversely, only the trailing surface 17 of the reduced-thickness thread 5 contact the channel formed in the material 12. The leading surface 16 of the reduced thickness thread 5 faces voids 18. In reality, however, the voids 18 are not completely empty of material. Rather, as the screw 1 of FIG. 1 is driven into the workpiece, some of the material 12 rebounds into the voids 18. The material in contact with the leading surface 16 of the reduced thickness thread 5 is under less compression than the material in contact with the leading edge 14 of the channel-forming thread 4 and thus produces less sliding friction as the screw 1 is turned. Therefore, the torque required to drive the reduced-friction screw 1 into a material is less than that required for a conventional screw which has only full-thickness thread. Further, the screw 1 has substantially the same holding power as a conventional screw. This is true because holding power is a function of the cumulative area of the thread and head taken in a plane perpendicular to the shaft, which is substantially the same for the present reduced-friction screw and for conventional screws.

Figure 3A:
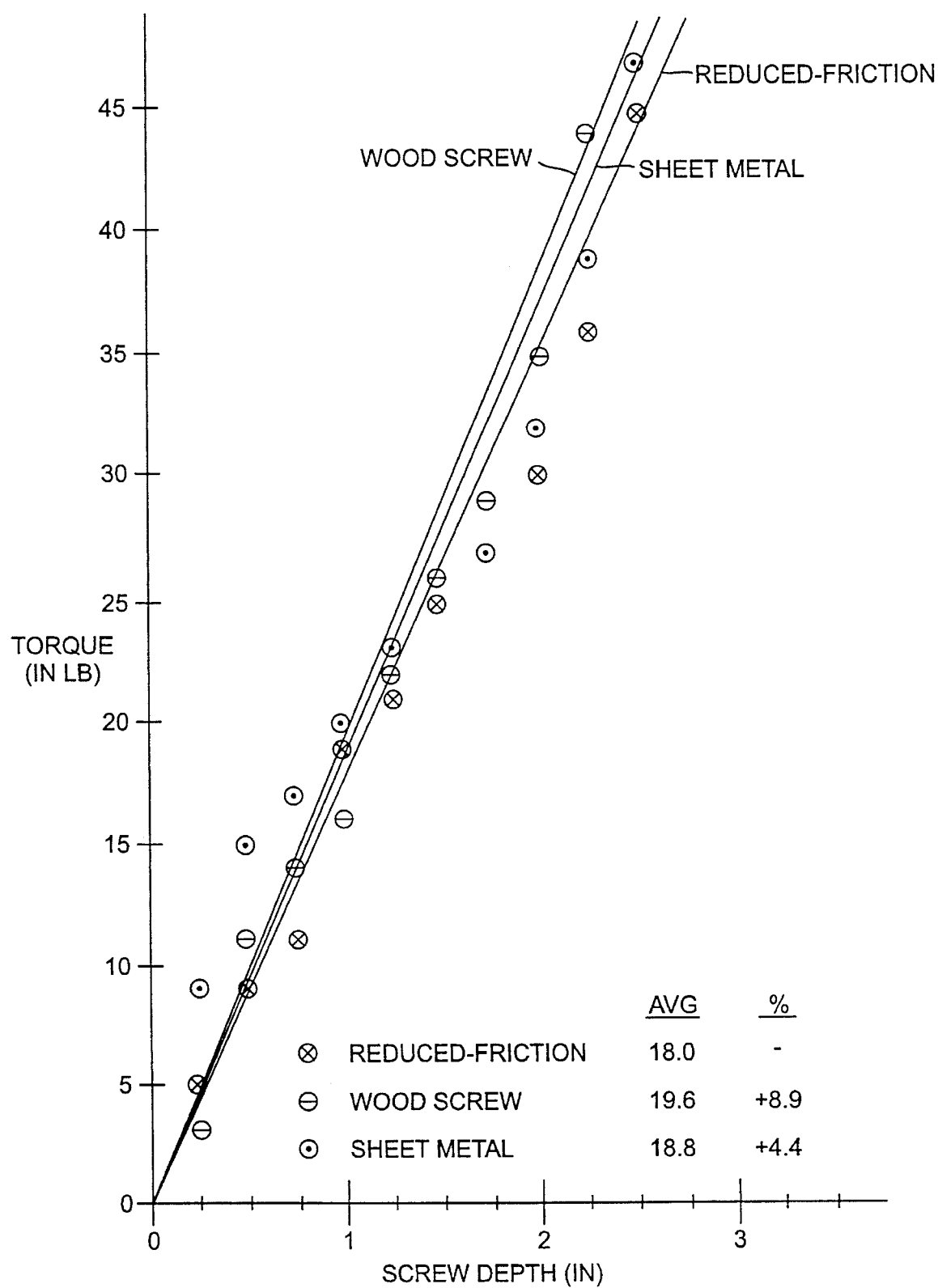
FIG. 3A is a graph of the data generated by Underwriters Laboratories, Inc. of a test comparing the torque required to drive a reduced-friction screw according to the present invention, a wood screw and a sheet metal screw, into soft pine.
Figure 3B:
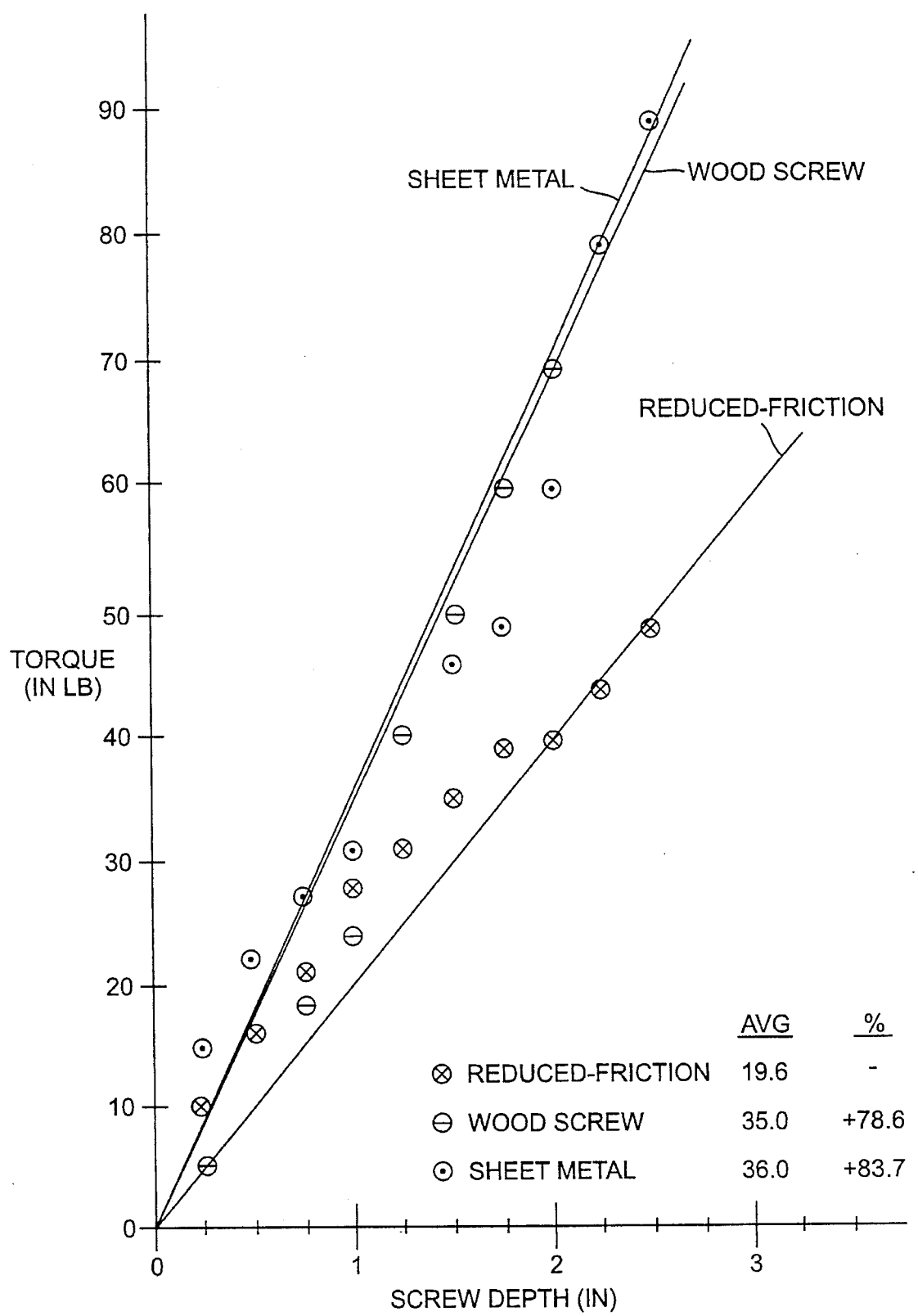
FIG. 3B is a graph of the data generated by Underwriters Laboratories, Inc. of a test comparing the torque required to drive a reduced-friction screw according to the present invention, a wood screw, and a sheet metal screw into hard pine.
Figure 3C:
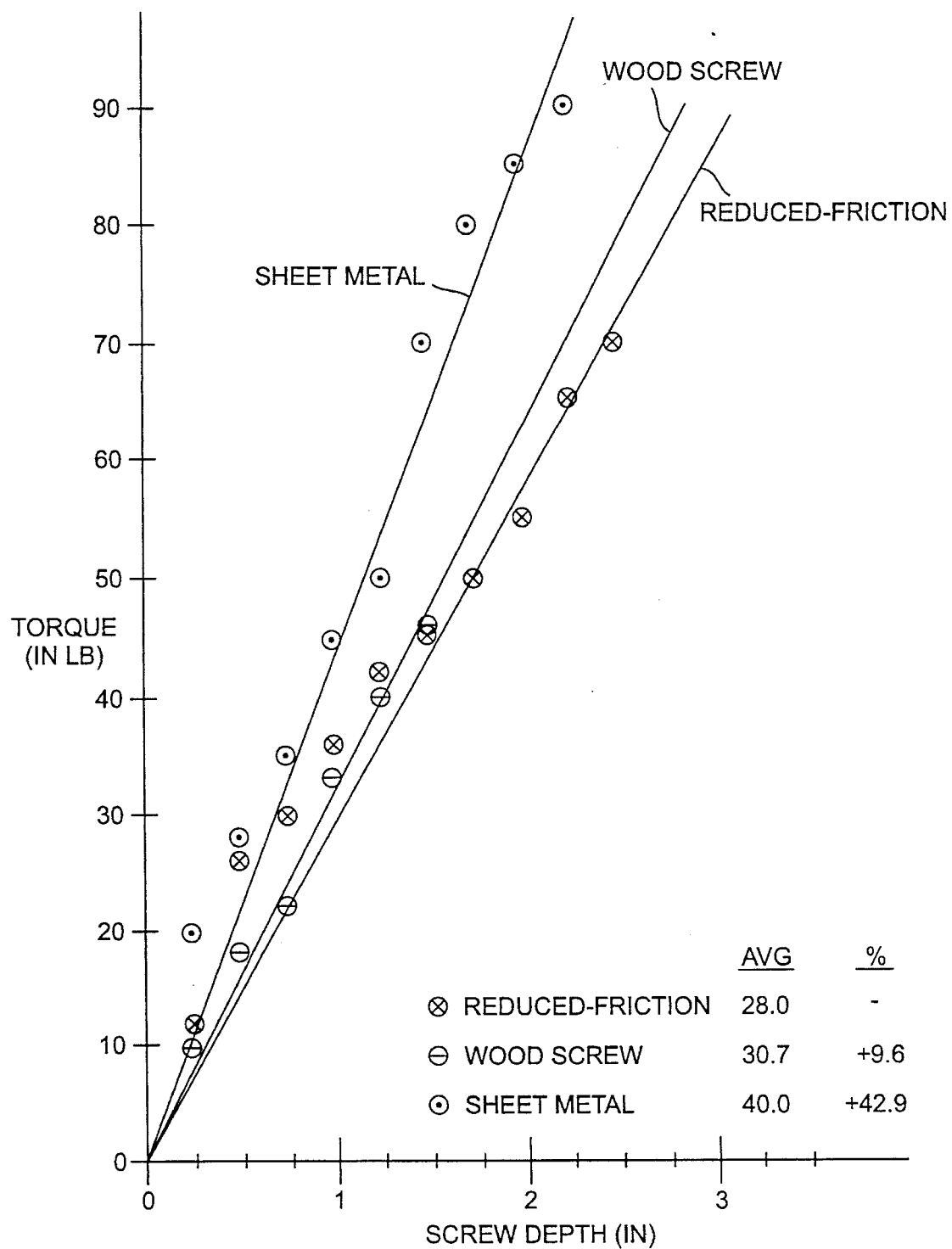
FIG. 3C is a graph of the data generated by Underwriters Laboratories, Inc. of a test comparing the torque required to drive a reduced-friction screw according to the present invention, a wood screw, and a sheet metal screw into white oak.

FIGS. 3A, 3B and 3C are graphs of the data generated during torque tests conducted by Underwriters Laboratories, Inc. of Melville, N.Y. A prototype reduced-friction screw according to the present invention, a conventional wood screw, and a conventional sheet-metal screw were used. Each type of screw was driven into three-inch thick, construction-grade soft pine, hard pine, and white oak using hand tools. The wood was free of knots and defects, and a one-inch long, one-eighth diameter hole was used to tap the screws. The torque required to drive the screws was measured at various depths and recorded, and the results were plotted. FIGS. 3A–3C show that the reduced-friction screw required less torque to be driven into soft pine, hard pine, or white oak than conventional wood or sheet-metal screws. Of particular interest are the results shown in FIG. 3B, which show a dramatic decrease in the torque required to drive a reduced-friction screw deeper into hard pine in comparison to the conventional wood or sheet metal screws.

Following the torque tests, a pull-out test was performed by Underwriters Laboratories, Inc. The screws were backed out to a depth of two inches and then subjected to a parallel tensile force applied at 2 ipm. The tensile force at pullout was then measured, and the results were as follows. For soft pine, the force required to remove the reduced-friction screw was 905 pounds, to remove the regular wood screw 194 pounds, and to remove the sheet-metal screw 936 pounds. For hard pine the force required to remove the reduced-friction screw was 565 pounds, and to remove the sheet-metal screw 730 pounds. Lastly, for white oak the force required to remove the reduced-friction screw was 1110 pounds, and to remove the sheet-metal screw 1010 pounds. Thus, the holding power of the reduced-friction screw compared favorably to that of the other type of screws tested.

FIG. 4A is a side view of another embodiment of a reduced- friction screw 30 according to the invention. The reduced- friction screw 30 has a head 3 having protrusions 7, a hardened metal shaft 2, channel-forming thread 4, and reduced thickness thread 5. In addition, the diameter 2' of the shaft is reduced at a reduction point 31 in comparison to the diameter of the shaft 2. The reduced-diameter shaft structure reduces the sliding friction as the screw is driven into a material compared to the screw 1 of FIG. 1. For example, as the screw 30 is driven into a material, the channel-forming thread 4 connected to the conical tip 8 compresses material out of the channel. The material exerts a back pressure against the thread and the shaft. As the screw advances, the material found after reduction point 31 expands, which reduces the back-pressure and resultant sliding friction against the shaft. It should be noted that the transition in diameter at the reduction point 31 should be placed as close as possible to the first reduced thickness thread 5' consistent with acceptable internal stresses of the screw 30. Of course, due to the reduced diameter shaft, the screw 30 has less resistance to shear forces and less pull-out strength than the screw 1 of FIG. 1. However, the screw 30 is suitable for use in many situations.

FIG. 4B is a side view of an alternate embodiment screw 35, which is a conventional screw machined to include a reduced-diameter shaft 36 occurring from a reduction point 38 up to the head 3. Reduction point 38 should preferably occur at the point along the shaft where a fully bored-out channel will occur as the screw 35 is driven into a material. Since all of the thread 37 of the screw 35 are of full thickness, more torque is required to drive the screw 35 into a material than needed for the screw 30 of FIG. 4A.

It should be noted that the screw depicted in FIG. 4B has an area 39 devoid of thread. This is a common wood screw configuration, and each of the embodiments of the invention described herein may be so formed.

FIG. 5A is a side view of yet another embodiment of a reduced friction screw 40 according to the present invention. The screw 40 is of the same basic structure as the screw 1 of FIG. 1, except that the reduced friction thread 41 is segmented. Arrow 46 depicts the direction of rotation of the screw 40 if removal from a workpiece was attempted.

FIG. 5B is a cross sectional view taken along line B—B of FIG. 5A, depicting the shape of the segments 42 that form the reduced thickness thread 41. In particular, each thread segment 42 is shaped like a ramp that has a depth which varies from zero at point 43, at the surface of the shaft 2, to a full depth at 44. Thus, the depth of the thread for each segment is gradually increased from zero to a full depth as one travels along the circumference of the shaft 2 in the direction of arrow 46. As shown in FIG. 5B, at point 44 the width of the segment 42 abruptly returns to zero to form a ridge 45. This pattern is repeated for each of the reduced thickness thread segments of the screw 40.

The reduced friction screw 40 of FIG. 5A provides superior resistance to loosening under conditions where the material is stressed by twisting, vibration, or warping because the barbed-shape formed at the ridge 45 of each segment 42, best seen in FIG. 5B, acts to resist loosening of the screw 40. Thus, as the screw 40 is driven into a material, the segmented, reduced thickness thread 41 create relatively little friction because the material cut by the full thickness channel-forming thread 4 is smoothly forced out of the way by the ramped shape of the segments 42. However, if a force is applied to rotate the screw 40 in the direction of arrow 46, then the ridges 45 of each segment 42 are forced against the material deposited into the channel and resist further motion. Since the screw 40 is difficult to withdraw from a material, it is thus suitable for use as a one-way screw.

The degree to which the screw 40 resists withdrawal from a material depends upon how the segments 42 are manufactured. For example, as shown in FIG. 5A, all of the reduced-thickness thread 41 may be segmented in the fashion described above all the way along the shaft 2 from the channel-cutting thread 4 to the head 3. Such a screw 40 has high resistance to withdrawal but poorer pull-out strength in comparison to the screw 1 of FIG. 1.

An alternate embodiment of the screw 40 of FIG. 5A contains a reduced number of segments 42 machined onto the shaft 2, starting at the head 3 and ending a predetermined distance from the channel-cutting thread 4. The remaining thread runs unbroken to the tip 8. The number of segments per revolution of the screw 40 may also be increased or decreased. Further, to improve the pull-out strength, the segments may be alternated with full-width reduced-thickness thread.

As will be apparent to those of skill in the art, the above described designs of the reduced-thickness thread and reduced-diameter shafts may all be beneficially combined in many different variations to form a reduced-friction screw according to the invention. Further, each of the concepts set out herein could be applied to conventional screws to reduce the turning friction and/or to improve the resistance to withdrawal of the screw.

I claim:

1. A reduced-friction screw, comprising:

a head having a top side and a bottom side, wherein the top side has an indentation for accepting a turning tool;

a shaft connected at its first end to the head and having a conical tip at its second end, wherein the shaft is of uniform diameter from the head to a base point located at the base of the conical tip;

a channel-cutting thread attached to the conical tip for boring a channel into a material; and a reduced thickness thread that is approximately half the thickness of the channel cutting thread and is of the same diameter as the largest diameter channel cutting thread, wherein the reduced thickness thread is attached to the shaft between the base point and the head.

2. The reduced-friction screw of claim 1, wherein the bottom side of the head contains protrusions which function to resist loosening of the screw when driven into a work piece.

3. The reduced-friction screw of claim 2, wherein the protrusions are semi-cylindrical.

4. The reduced-friction screw of claim 2, wherein the protrusions are wedge-shaped.

5. The reduced-friction screw of claim 1, wherein the reduced thickness thread is segmented.

6. The reduced-friction screw of claim 5, wherein each segment is ramp-shaped.

7. The reduced-friction screw of claim 1, wherein a portion of the reduced thickness is segmented.

8. The reduced-thickness screw of claim 7, wherein each segment is ramp-shaped.

9. The reduced-friction screw of claim 1, wherein reduced thickness thread begins at the base point and ends at a predetermined distance from the head.

\* \* \* \* \*